Patented Jan. 26, 1943

2,309,335

UNITED STATES PATENT OFFICE 2,309,335

ESTERS OF HYDROXYPOLYARYL METHANES AND PROCESS FOR PREPARING SAME

Herman A. Bruson, Philadelphia, Pa., assignor to The Resinous Products & Chemical Company, Philadelphia, Pa., a corporation of Delaware No Drawing. Application January 31, 1941, Serial No. 376,837

9 Claims. (Cl. 260—479)

This invention relates to a method for preparing esterified hydroxypolyaryl methanes and to the new products obtained thereby.

According to this invention esterified hydroxypolyaryl methanes are obtained by reacting, in the presence of acidic condensing agents as catalysts, esters of monocarboxylic acyloxymethyl phenols with aromatic compounds having a free reactive nuclear hydrogen atom. The products are useful as resins, tanning agents when sulfonated, and moth-proofing materials.

Typical of the reactive aromatic componds are the aromatic hydrocarbons of the benzene, diphenyl, naphthalene, anthracene, phenanthrene and higher condensed ring series, as well as their nuclear hydroxy, alkoxy, aryloxy, halogen, alkyl, aralkyl, cycloalkyl, aryl, acyl, nitro, carboxylic, and sulfonic acid substitution products. Depending upon the number of available reactive nuclear hydrogen atoms in the above, one or more esterified hydroxyphenyl methyl groups may be introduced in the aromatic nucleus. For this reason the products from the less substituted aromatic compounds may provide cross linkages which lead to resinous products.

The esters of the monocarboxylic acyloxymethyl phenols may be obtained as described in my copending applications, Serial No. 272,804, filed May 10, 1939, and Serial Nos. 334,169, 334,170, 334,171, and 334, 172, filed May 9, 1940 and in U. S. Patent No. 2,220,834, issued November 5, 1940. It is shown therein that a condensation product of a phenol, formaldehyde, and a nonaromatic secondary amine, usually considered to be a tertiary aminomethyl phenol, may be reacted with a carboxylic acid anhydride to form an ester of an acyloxymethyl phenol or methylol or polymethylol phenol in which both methylol and phenolic hydroxyl groups are esterified. The acyl group reacted with the phenolic hydroxyl group may be the same as or different than that attached to the methylol group. If the phenolic hydroxyl group is first esterified, as described in U. S. Patent No. 2,218,739, issued October 22, 1940, with a group from a mono- or polycarboxylic acid, such as acetic, butyric, lauric, stearic, crotonic, undecenic, oleic, succinic, adipic, sebacic, cinnamic, benzoic, abietic, etc., the resulting ester may then be reacted with a monocarboxylic acid anhydride. There may likewise be reacted an aminomethyl phenol itself and a monocarboxylic anhydride. Such anhydride is preferably from one of the lower aliphatic monobasic acids such as, for example, acetic, propionic, crotonic or butyric, but it is to be understood that the anhydrides of higher aliphatic acids, as well as of other carboxylic acids of the aliphatic, aromatic, alicyclic, or heterocyclic series can be used, such as benzoic anhydride, furoic anhydride, hexahydrobenzoic anhydride, etc.

To form the aminomethyl phenols there may be used any phenol having at least one reactive hydrogen in the positions which are ortho or para to the phenolic hydroxyl group. The term "phenol" as used herein includes monohydric and polyhydric hydroxyaromatic compounds of the benzene, diphenyl, naphthalene, and higher condensed ring systems as well as their nuclear alkyl, halogen, alkoxy, aryloxy, aralkyl, cycloalkyl, aryl, and acyl substitution products. Typical of those are phenol itself, the cresols, the various xylenols, alkyl phenols having 2 to 18 carbon atoms or more in the alkyl group, cycloalkyl phenols such as cyclohexyl phenol or camphyl phenol, benzyl phenol, phenyl phenol, polynuclear phenols such as p,p'-dihydroxy diphenyl propane-2 p,p'-dihydroxy diphenyl methane, p,p'-dihydroxy diphenyl sulfone, or α- or β-naphthol, polyhydric phenols, such as resorcinol, pyrocatechol, hydroquinone, etc.

The condensation is effected readily with acidic catalysts such as sulfuric acid, sulfonic acids, fluoboric acid, surface-active siliceous clays, such as "Filtrol", "Tonsil", "Floridin", and "Attapulgus" clays, halides of amphoteric elements such as the chlorides or bromides of zinc, iron, tin, titanium, antimony, or bismuth, and the so-called Friedel-Crafts catalysts such as aluminum chloride, or boron trifluoride.

The reaction may be formulated as follows:

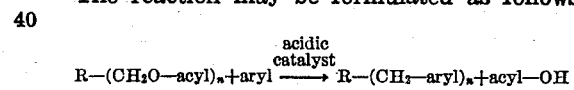

where R is an esterified hydroxyaromatic nucleus, $n$, a small whole number, represents the number of acyloxymethyl groups present in said aromatic nucleus, and aryl represents an aromatic residue having a labile nuclear hydrogen atom capable of replacement.

A typical condensation of this type is, for example, that of 2,4,6-trisacetoxymethyl phenyl acetate with 2,4-dichlorophenol which takes place readily in the presence of sulfuric acid as a catalyst according to the following equation:

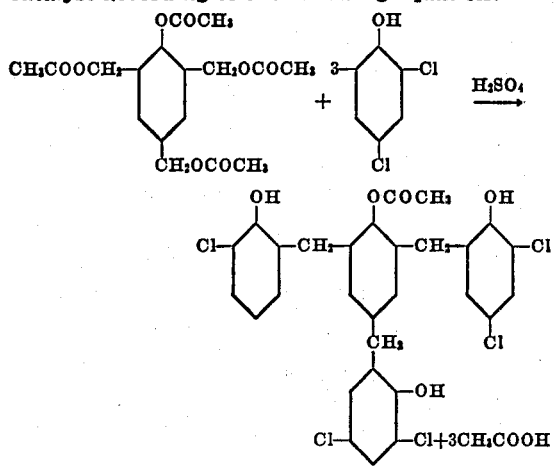

Another typical example is the condensation of naphthalene with 2-acetoxymethyl-4-tertiary butyl phenyl acetate which takes place on heating the components in the presence of a surface-active clay ("Tonsil") according to the following equation:

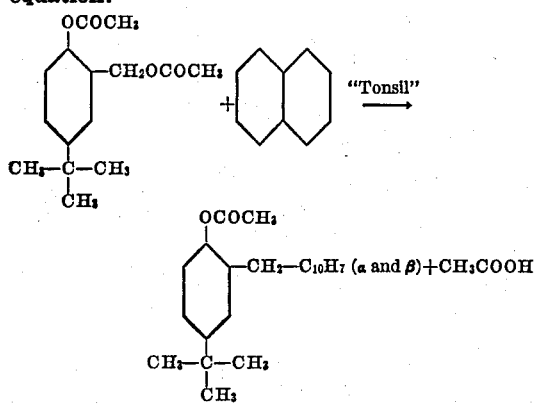

In a similar manner, other aromatic compounds having a reactive nuclear hydrogen atom, for example benzene, toluene, anisole, diphenyl, anthracene, phenanthrene, tetrahydronaphthalene, diphenyl ether, α- or β-naphthol, and the like may be used in place of the dichlorophenol or naphthalene shown above. Likewise, other acyloxymethyl phenyl esters such as the following may be used in place of the 2,4,6-trisacetoxymethyl phenyl acetate and the 2-acetoxymethyl-4-ter-butyl phenyl acetate shown above, namely:

2,4,6-trisacetoxymethyl-m-cresyl acetate,

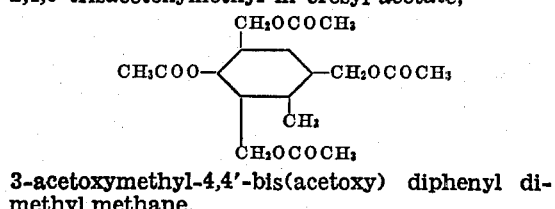

3-acetoxymethyl-4,4'-bis(acetoxy) diphenyl dimethyl methane,

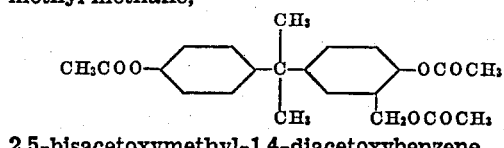

2,5-bisacetoxymethyl-1,4-diacetoxybenzene,

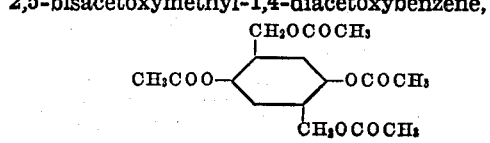

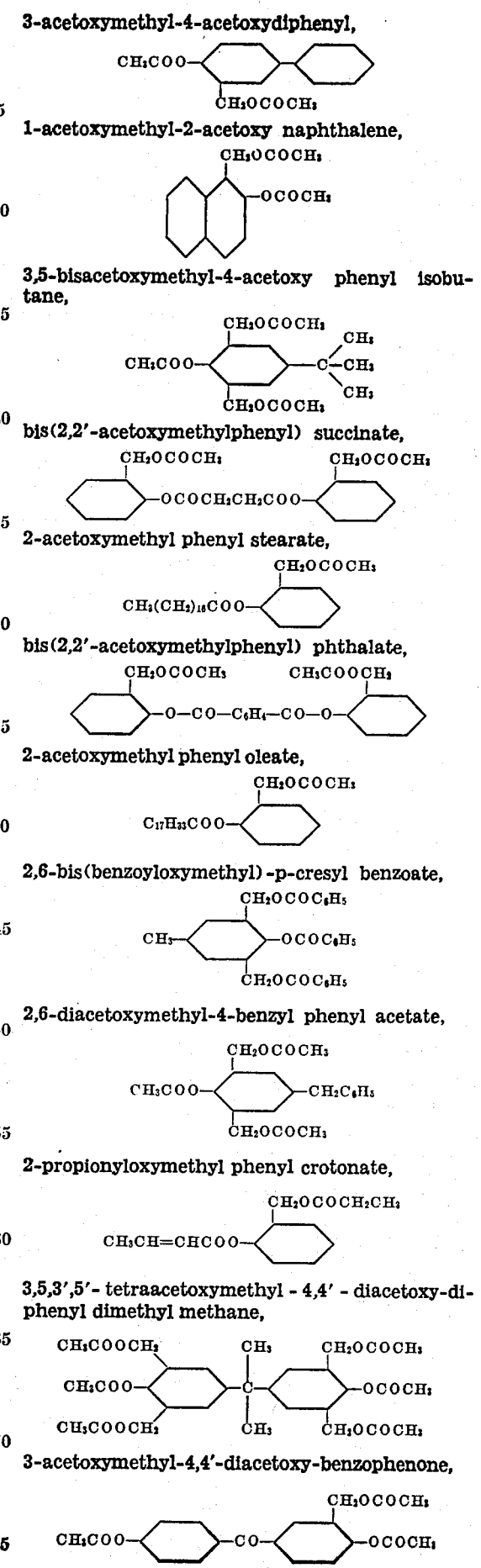

3-acetoxymethyl-4,4'-bis(acetoxydiphenyl) sulfone,

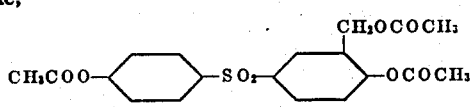

3-acetoxymethyl-4,4'-bis(acetoxydiphenyl) cyclohexane,

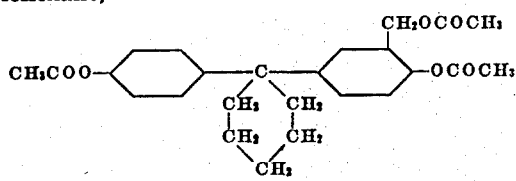

3,5-bis(acetoxymethyl)-4-acetoxy butyl benzoate,

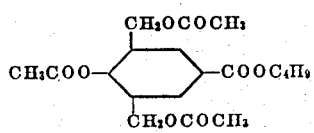

In practicing this invention, the components are preferably reacted in the proportions of at least one molecule of aryl component for each acyloxymethyl group present in the phenolic ester component. The proportions may, however, be widely varied depending upon the number of acyloxymethyl groups which it is desired to react or the number of esterified hydroxy phenyl methyl groups it is desired to introduce in the aryl component. The condensation may be carried out in a solvent inert toward the reactants, such as glacial acetic acid, ether, carbon disulfide, petroleum ether, and the like.

The following examples illustrate this invention in greater detail, it being understood that the acyloxymethyl phenol esters and aryl components can be replaced mol for mol by other esters or aryl compounds, such as those mentioned above.

Example 1

To a solution consisting of 35.2 g. of 2,4,6-trisacetoxymethyl phenyl acetate and 48.6 g. of 2,4-dichlorophenol in 125 g. of glacial acetic acid there was added dropwise 100 g. of concentrated sulfuric acid (sp. gr. 1.84) while the mixture was stirred and cooled so that the temperature did not exceed 30° C. After the acid had been added, the mixture was stirred at 40 to 45° C. for two hours during which time the clear solution became milky and finally separated as a solid resinous mass. The liquid was poured off and the solid ground up with water and rinsed with dilute ammonia. The cream-colored powder thus obtained was then thoroughly washed and dried. The dried powder weighed 50 g. It is soluble in warm benzene and can be recrystallized from a mixture of equal parts of benzene and petroleum ether. Its analysis and saponification value agree with the formula

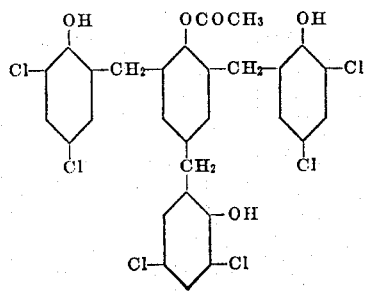

Example 2

A mixture of 42.6 g. of naphthalene, 88 g. of 2-acetoxymethyl-4-ter-butyl phenyl acetate and 6.5 g. of "Tonsil" clay was stirred and heated under a reflux condenser attached to a trap for collecting the acetic acid evolved. The temperature during the condensation ranged from 165 to 185° C., the time required therefor being two hours. The acetic acid which came over weighed 16 g. (theory 20 g.). The reaction mixture was extracted with benzene and filtered to remove the clay. The filtrate was then distilled in vacuo and the desired product came over between 205 and 225° C./1 mm. in the form of a colorless oil. Yield 53 g. Sap. value 169.8 (theory 169). Its analysis agrees with the formula:

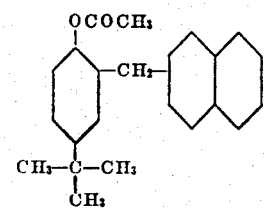

Apparently, two isomers are present, one being the α- and the other the β-naphthyl derivative.

Example 3

Boron trifluoride was passed into a cooled mixture of 50 g. of benzene and 35 g. of 2,4,6-trisacetoxymethyl phenyl acetate at 10° C., until 5.5 g. were absorbed. The mixture was allowed to stand several hours at room temperature and then boiled on a steam bath under reflux for one hour. The solution was then cooled, thoroughly washed several times with water and dried. The excess benzene was evaporated under reduced pressure, leaving as the residue a pale resinous product which was insoluble in alcohol or petroleum ether but which dissolved readily in toluene or in acetone.

Of especial interest are the compounds which are prepared by the above-described process and which correspond to the general formula $$R(CH_2\text{-aryl})_m$$

wherein R is an esterified hydroxy aromatic nucleus, aryl represents an aromatic residue, and m is a small whole number having a value greater than one. The process described is of further interest in that it permits the preparation of such complex esters in which the group designated as "aryl" in the above formula is a polynuclear aromatic nucleus.

I claim:

1. A process for preparing an esterified hydroxy polyaryl methane, which comprises reacting in the presence of an acidic catalyst a carboxylic acid ester of a monocarboxylic acyloxymethyl phenol with an aromatic compound having a reactive nuclear hydrogen atom.

2. A process for preparing an esterified hydroxy polyaryl methane, which comprises reacting in the presence of an acidic catalyst a compound of the formula $$R(CH_2O\text{-acyl})_n$$

wherein R represents a carboxylic acid esterified hydroxyaromatic nucleus, acyl represents a monocarboxylic acyl group, and n represents a small whole number, with reacting proportions of a compound having a reactive nuclear hydrogen atom.

3. A process for preparing an esterified hydroxy polyaryl methane, which comprises reacting in the presence of an acidic catalyst a compound of the formula

wherein R represents a carboxylic acid esterified hydroxyaromatic nucleus and acyl represents a monocarboxylic acyl group, with reacting proportions of an aromatic compound having a reactive nuclear hydrogen atom.

4. A process for preparing an esterified hydroxy polyaryl methane, which comprises reacting in the presence of an acidic catalyst a compound of the formula

wherein R represents a carboxylic acid esterified hydroxyaromatic nucleus and acyl represents a monocarboxylic acyl group, with reacting proportions of an aromatic compound having a reactive nuclear hydrogen atom.

5. A process for preparing a compound of the formula

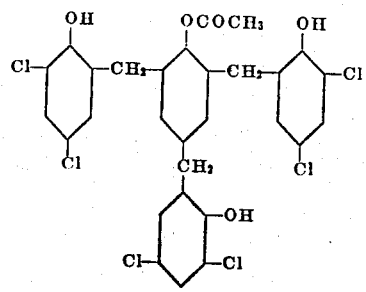

which comprises condensing 2,4-dichlorophenol, in the presence of an acidic catalyst, with 2,4,6-trisacetoxymethyl phenyl acetate.

6. A process for preparing a compound of the formula

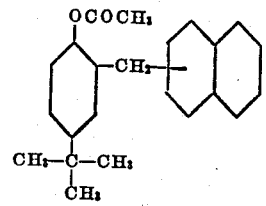

which comprises condensing naphthalene in the presence of an acidic catalyst with 2-acetoxymethyl-4-ter-butyl phenyl acetate.

7. An esterified hydroxy polyaryl methane having the formula

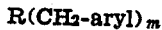

wherein R is a carboxylic acid esterified hydroxy aromatic nucleus, aryl represents an aromatic residue, and $m$ is a small whole number having a value greater than one.

8. An esterified hydroxy polyaryl methane having the formula

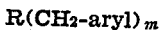

wherein R is a carboxylic acid esterified hydroxy aromatic nucleus, aryl represents a polynuclear aromatic residue, and $m$ represents a small whole number having a value greater than one.

9. A compound of the formula

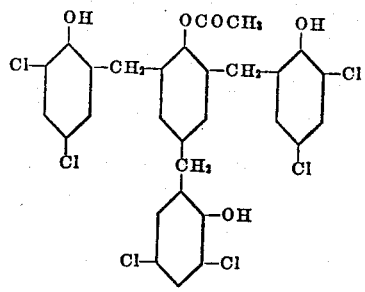

HERMAN A. BRUSON.